Oct. 3, 1967
B. D. BERGER
3,344,647
MECHANICAL DEVICE
Filed April 7, 1965
2 Sheets-Sheet 1
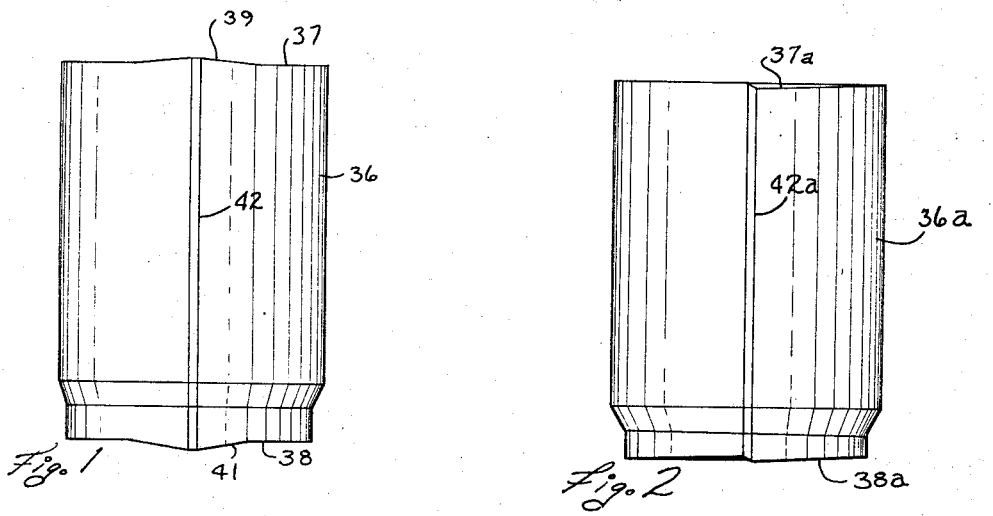
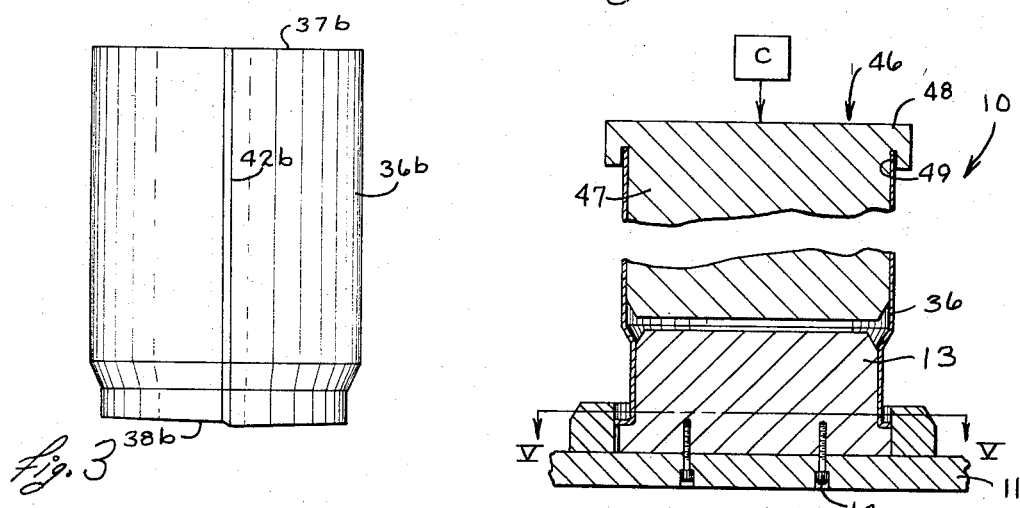
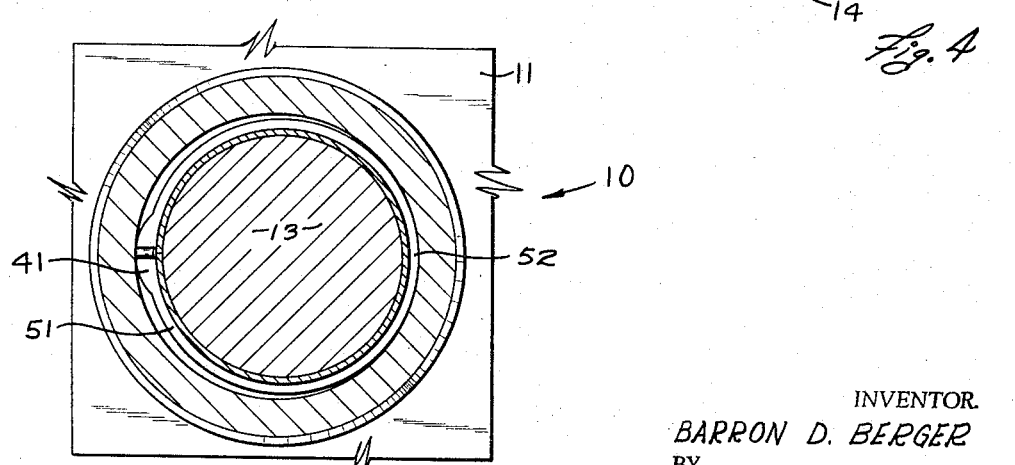
INVENTOR.
BARRON D. BERGER
BY
Woodhams, Blanchard & Flynn
ATTORNEYS

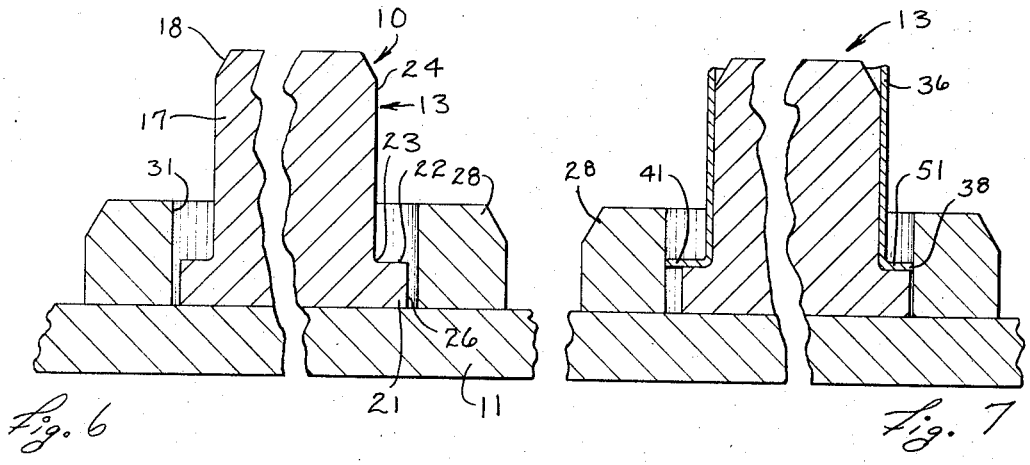
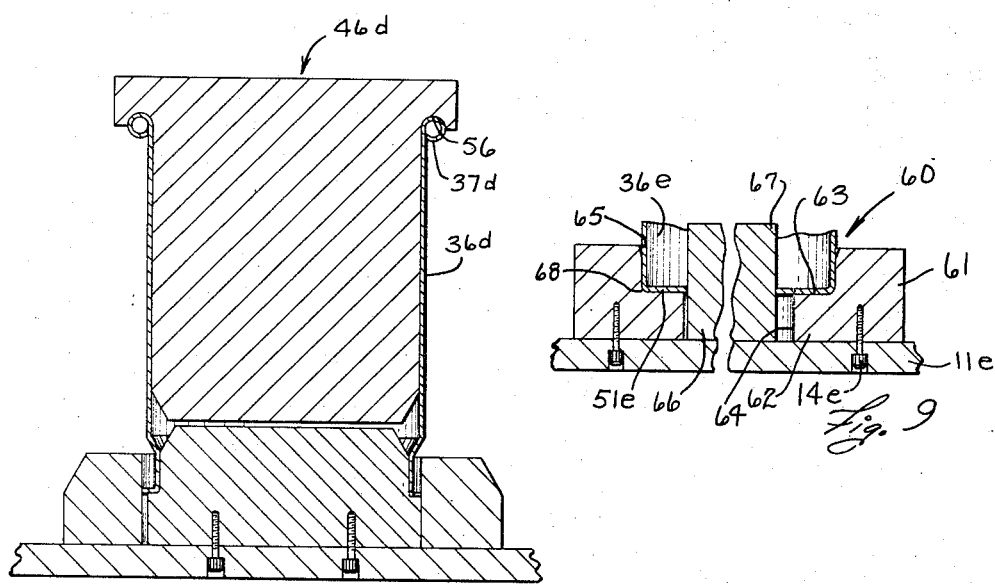

United States Patent Office 3,344,647
Patented Oct. 3, 1967

3,344,647
MECHANICAL DEVICE
Barron D. Berger, Bay City, Mich., assignor to National Electric Welding Machines Co., Bay City, Mich., a corporation of Michigan
Filed Apr. 7, 1965, Ser. No. 446,188
5 Claims. (Cl. 72—354)

ABSTRACT OF THE DISCLOSURE

A method and apparatus for flanging the end of an annular shell wherein said shell is telescoped snugly over a mandrel and pressed against a radially extending flange to cause a deflection at one end thereof. The radial movement of the deflected portion of the shell is stopped by a radially movable annular ring or a radially movable mandrel depending upon whether the shell is deflected radially outwardly or radially inwardly, respectively.

---

This invention relates to a method and apparatus for flanging the end of an annular shell and more particularly relates to a method and apparatus for ofrming a flange on an irregularly shaped end edge of a substantially cylindrical container shell without buckling the container wall.

Circular, cylindrical shells for containers are often constructed by rolling a flat sheet into a curved condition and fastening the adjacent longitudinal edges of the curved sheet together, for example, by welding in a butt or lap joint. Depending on the type of joint used, the thickness and/or rigidity of the shell at the joint often varies substantially from that at other locations on the shell. At a lap joint, for example, the wall thickness substantially doubles. At a welded butt joint, the rigidity of the wall may be substantially changed by a relatively thick weld bead, by use of particular welding rod material or as a result of changes in the material of the shell due to the heat of welding, tending to make it more easy to stretch or less easy to transversely bend the wall of the shell at the joint. There may also be, in certain instances, discontinuities of metal thickness or forming characteristics at other points in the shell due, for example, to imperfections in the original sheet.

It is often desired to change the diameter or to modify the strictly cylindrical form of such shells by expanding or contracting the shell along at least a portion of its length. Such reforming of the shell may be accomplished in any convenient manner, such as by spinning. It has been found in expanding shells having longitudinal seams that are thicker or stronger than the rest of the shell that the length of the shell tends to be reduced except for the seam area, the seam tending thus to become longer than the rest of the shell. As a result, the end edges of such a reformed shell are generally uneven and noncoplanar. Such an uneven end edge configuration may also arise in cases where the shell is left in a cylindrical condition but an attempt is made to flatten or thin the bead area.

It has also been found that one or both end edges of a shell may be uneven due to a mismatch of the sheet edges at the seam or a difference in the lengths of the edges to be joined.

In forming containers from such shells one or both ends of the shell are often worked to form integral flanges extending substantially radially from the shell. It has often been the practice in the past to form containers from such shells by simultaneously flanging one end thereof and forming a rolled rim on the other end thereof.

In the past such flanging has been accomplished by the use of a monolithic die member having a cylindhical, flat-bottomed annular groove into which the end of the shell is coaxially inserted. To form a radially outwardly extending flange, the shell closely surrounds the inner wall of the groove and is spaced from the outer wall thereof. Downward pressure on the shell causes its lower end edge to be deflected radially outwardly by the bottom of the groove for forming the radial flange. Contact of the outer edge of the flange with the outer wall of the groove stops the further flanging at the pressure used and upon release of pressure the flanged shell end can be withdrawn from the die.

This prior art method of flanging has generally been unsuccessful when shells having irregular edges are presented thereto or even, in certain cases, when the shell thickness or strength varies markedly at different points on the circumference of the shell. Difficulties are particularly apparent when a small portion of the lower edge of the shell protrudes beyond the rest. As the flange forms, the protruding portion contacts the outer wall of the groove and is stopped thereby before the remaining portion of the flange is completely formed. Under such conditions, the normal downward pressure on the shell will continue to move same downwardly into the die since the majority flange is not in abutment with the outer groove wall and, hence, does not develop sufficient back pressure as to prevent further downward movement of the shell. Thus, continuing downward movement of the shell often results in buckling of the shell above the protruding portion of the flange since abutment thereof with the outer wall of the groove allows no further outward movement thereof. The buckling apparently results from an excessive concentration of downward pressure on the part of the shell wall aligned with the protruding edge portion. Such buckling generally ruins the shell and, hence, can be a substantial economic problem to the container manufacturer. It has been found in previous practice that such buckling can occur in a variety of flanging situations as when both ends of a shell are being flanged, when one end is being flanged and the other end is being curled or, as a further alternative, when flanging takes place concurrently with other working of the shell such as placement of a circumferential bead thereon.

Accordingly, the objects of this invention include:

(1) To provide a method and apparatus for forming a flange on the end of an annular shell which method and apparatus are particularly adapted for forming flanges on shells having discontinuities in material strength or thickness or uneven edges without buckling of the shell wall.

(2) To provide a method and apparatus, as aforesaid, which may be used alone or in combination with other operations and material working apparatus and which allows flanging one end of a shell either as a single operation or simultaneously with curling, flanging or beading of other portions of the shell.

(3) To provide a method and apparatus, as aforesaid, which allows flanging of the end of a shell having a portion in one or both edges thereof which projects beyond the rest of said edge without buckling of said shell.

(4) To provide a method and apparatus, as aforesaid, which allows flanging the end of a substantially cylindrical shell rolled from a flat sheet and having a longitudinal seam formed by sheet edges which are longitudinally displaced or which are of unequal longitudinal length whereby one or both end edges of the shell are uneven.

(5) To provide a method and apparatus, as aforesaid, which allows flanging of a substantially cylindrical rolled and welded shell having a longitudinal weld seam elongated by radial expansion or contraction of said shell.

(6) To provide a method and apparatus, as aforesaid, particularly capable of forming substantially radially outwardly directed flanges on a substantially cylindrical shell and adaptable to making substantially radially inwardly directed flanges or flanges which are sloped with respect to the axis of a shell.

(7) To provide a method and apparatus, as aforesaid, in which the shell remains substantially centered in the flanging zone of a flanging die during the flanging operation, in which the outer edge of the flange is free to move radially until at least two substantially opposed portions on said flange reach the perimeter of said zone and in which compressive stress exerted longitudinally of the shell during flanging is not allowed to reach a high value in a single circumferential region of the shell whereby to prevent buckling of the shell in that region.

(8) To provide a method and apparatus, as aforesaid, which will involve substantially no increase in complexity or in cost of flanging equipment or use thereof but will tend to greatly reduce damage to the container shells during flanging.

Other objects and purposes of this invention will be apparent to persons acquainted with apparatus of this general type upon reading the following specification and inspecting the accompanying drawings.

In the drawings:

FIGURE 1 is a side elevational view of a rolled and welded shell, the upper portion of which has been expanded with the result that the length of the seam is increased and capable of being flanged by the method and with the apparatus embodying the invention.

FIGURE 2 is a side elevational view of a shell welded with the seam edges longitudinally displaced with respect to each other.

FIGURE 3 is a side elevational view of a shell with seam edges of unequal length.

FIGURE 4 is a fragmentary central cross-sectional view of apparatus embodying the invention shown at the conclusion of forming a flange on an annular shell.

FIGURE 5 is a sectional view substantially as taken on the line V—V of FIGURE 4.

FIGURE 6 is an enlarged fragment of FIGURE 4 with the shell removed and showing the mandrel centered within the stop ring.

FIGURE 7 is an enlarged fragment of FIGURE 4 showing same at the conclusion of the flanging operation.

FIGURE 8 is a central cross-sectional view of apparatus similar to that of FIGURE 4 but capable of curling one edge of the shell as the other is flanged.

FIGURE 9 is a view similar to FIGURE 7 but showing a modification.

Certain terminology will be used in the following description for convenience in reference only and will not be limiting. The words "upwardly," "downwardly," "rightwardly" and "leftwardly" will designate directions in the drawings to which reference is made. The words "inwardly" and "outwardly" will refer to directions toward and away from, respectively, the geometric center of the device and designated parts thereof. Said terminology will include the words above specifically mentioned, derivatives thereof and words of similar import.

*Description*

Turning now to the drawings and specifically to FIGURES 4, 5 and 6, the apparatus 10 embodying the invention includes a preferably horizontal base plate 11 supported by any convenient means not shown. An upstanding mandrel 13 is supported upon the base plate 11 and is affixed thereto by any convenient means such as the screws 14. The mandrel 13 includes an upstanding, substantially cylindrical pilot portion 17 which is preferably of circular cross section and is preferably chamfered at the upper end thereof as indicated at 18 (FIGURE 6).

The mandrel 13 further includes a substantially radially outwardly extending flange 21 which is coaxial with the pilot 17. In the particular embodiment shown, the upwardly facing surface 22 of the flange 21 extends substantially radially outwardly from the pilot portion 17. However, it is contemplated that the surface 22 may in certain instances be sloped upwardly or downwardly or even curved somewhat, if desired. A fillet 23 is preferably provided at the intersection of the upper surface 22 and the peripheral wall 24 of the pilot 17. The peripheral wall 26 of the flange 21 is preferably cylindrical, circular in cross section and coaxial with the peripheral wall 24.

A stop ring 28 rests firmly upon and is laterally slideable on the base plate 11. The stop ring 28 has a preferably circularly cylindrical central opening 31 which extends vertically therethrough for defining a closed, rigidly bounded and movable zone therewithin. The internal diameter of the central opening 31 is greater than the external diameter of the peripheral wall 26 and the stop ring 28 normally surrounds and is radially spaced from the flange 21. The height of the stop ring 28 is somewhat greater than that of the flange 21. In the particular embodiment shown, the height of the stop ring 28 is less than the height of the pilot 17.

The pilot 17 is arranged to snugly receive in telescoped relation thereover, the lower end of a container shell 36 as indicated in FIGURES 4 and 7. The pilot portion 17 prevents inward buckling of the portion of the shell 36 surrounding same and rigidly locates the central axis of such shell.

The shell 36 may be of any desired type having walls which conform to the shape of the pilot 17.

The apparatus 10 embodying the present invention is shown for purposes of illustration to be used with a shell 36 corresponding to that shown in FIGURE 1. The shell 36 of FIGURE 1 has end edges 37 and 38 which are uneven and in the particular embodiment shown have protruding portions indicated at 39 and 41, respectively, at the ends of a seam 42. Here, the portions 39 and 41 result from longitudinal contraction of the rest of the shell during expansion of the upper portion thereof. It is also contemplated that a shell 36a (FIGURE 2) or 36b (FIGURE 3) can be worked by the apparatus 10. The shell 36a is substantially similar to the shell 36 except that the edges 37a and 38a thereof are made uneven by misalignment of the edges of the sheet forming same at the seam 42a. The shell 36b of FIGURE 3 is also similar except that one edge, here the upper edge 37b, is even and radially disposed whereas the bottom edge 38b thereof is uneven due to a difference in the length of the edges comprising the seam 42b. It is also contemplated, of course, that the apparatus 10 may be used with shells of different types including shells having no irregularities in the edges thereof and shells with and without deviations in the wall thickness and strength at various points around the circumference thereof.

In the particular embodiment shown, a ram 46 is provided for urging the shell against the flange 21. The ram 46 may be of any desired type and, in the particular embodiment shown, comprises a circular cylindrical body 47 having a radially extending upper end portion 48 which is annularly grooved at 49 for receiving the upper end of the shell 36. Any convenient pressure exerting means, such as the pressure fluid cylinder indicated schematically at C, may be employed to urge the ram 46 coaxially toward the mandrel 13.

If desired, the mandrel may be allowed to slide on the base plate 11 and the stop ring 28 may be fixed. Such an arrangement may, however, complicate the driving of the ram 46.

*Operation*

The method of the present invention may be advantageously carried out by use of the apparatus embodying the invention and will be so set forth below for illustrative purposes. However, the method embodying the invention may be carried out by other means as well.

The operation of the apparatus 10 embodying the invention normally begins with the stop ring 28 surrounding the flange 21 of the mandrel 13. The stop ring 28 need not be concentric with such flange since it is freely laterally slideable and, hence, self aligning with respect thereto. With the ram 46 removed from opposition of the mandrel 13, a shell, here illustrated by the shell 36, is snugly but slideably telescoped over the pilot portion 17 of the mandrel 13 until the edge 38 of said shell firmly engages the surface 22 of the flange 21. Any convenient means, here the ram 46, may be used to urge the shell 36 axially against the surface 22. Thus, the ram 46 is snugly inserted into the upper end of the shell 36. The upper end of the shell is thus received in the groove 49 and backed by the portion 48 so that a downward force may be exerted on the shell 36 by the cylinder C and through the ram 46. The opposed ends of the ram 46 and mandrel 13 are spaced to allow downward movement of the shell along the pilot portion 17. The axial force exerted on the shell 36 causes the lower edge of said shell to be deflected radially outwardly, the fillet 23 if provided tending to facilitate such deflection. Continued application of such pressure causes the lower end of the shell 36 to move or flow radially outwardly along the surface 22. As flanging continues, a point on the lower edge 38 will in time contact the surface of the opening 31 in the stop ring 28. Since the stop ring 28 is relatively freely slideable on the base plate 11, continued expansion of the shell flange is not impeded. As such expansion continues, however, a further portion or portions spaced along the shell flange will contact the stop ring.

If for example, the stop ring is initially centered on the mandrel 13 and a shell similar to shell 36 is being flanged, the protruding portion 41 of the shell flange will contact the stop ring first and push the ring eccentrically of the mandrel as the shell flange continues expansion. Eventually, further movement of the stop ring 28 will be prevented by engagement thereof by a portion 52 (FIGURE 5) of the shell flange 51 spaced from and opposed to the protruding portion 41.

Upon such stopping of free movement of the stop ring 28 by contact therewith of spaced portions of the shell flange 51, the force required to further telescope the shell on the pilot portion 17 rises sharply and extends the force of the ram. As a result, the shell moves no further along the mandrel 13 and the shell flange expands no further.

It will be noted that the downward force of the ram 46 will be transferred by not one but at least two or three segments of the shell to the stop ring, each such segment corresponding to a portion of the shell flange in contact with the stop ring. Thus, the axial compressive force on the shell is spread over a substantially greater cross sectional area and the maximum axial unit pressure is substantially lower than would be the case if the stop ring 28 were fixed with just one portion of the flange 51 in contact therewith. As a result, the method and apparatus of the present invention eliminates the buckling of the wall of the sleeve 36 above the flange 51 which often occurred in prior art apparatus.

With the flange 51 so formed, the ram 46 may be removed thereby allowing removal of the flanged shell 36 from the pilot 17 of the mandrel 13. Thus, the apparatus 10 is ready for flanging another shell.

*Modification*

FIGURE 8 illustrates a modified construction in which the ram 46d carries an annular semicircular recess 56 in the place of the groove 49 of the ram 46 whereby the upper edge 37d of the shell 36d may be curled or rolled as the flange is formed on the lower end of the shell 36d.

FIGURE 9 illustrates a further modification of the apparatus embodying the invention. Parts of the modified apparatus 60 corresponding to parts of the apparatus 10 of FIGURE 4 described hereinabove are designated by the same reference numerals thereas with the suffix "e" added thereto. The apparatus 60 includes a base plate 11e which supports an annular stop ring 61 affixed to the upper surface thereof by any convenient means such as the screw 14e. The stop ring 61 is provided with an inwardly extending annular flange 62 which has a preferably substantially radially arranged upper surface 63 and defines a preferably circularly cylindrical central opening 64.

A mandrel 66, which is upstanding from and freely laterally slideable upon the upper surface of the base plate 11e is normally surrounded by the stop ring 61. The peripheral wall 67 of the mandrel 66 is preferably circularly and cylindrically shaped. A chamfer 65 is preferably provided on the upper and inner edge of the stop ring 61. The apparatus 60 is used for forming an inwardly directed substantially radial flange 51e on the lower edge of a container shell 36e.

The operation of the apparatus 60 is substantially similar to that of the apparatus 10, differing therefrom primarily only in that the lower end of the shell 36e is inserted snugly but slideably within the stop ring 61 and bottoms on the stop ring flange 62. A downward force on the shell causes the lower edge thereof to be deflected by the fillet 68 at the outer edge of the surface 63. Continued downward force on the shell 36e causes the deflected lower edge to move or flow inwardly along the surface 63. The resulting formation of the inwardly directed shell flange 51e continues as a portion of the shell flange 51e contacts the periphery 67 of the slideable mandrel 66. The mandrel is moved by the flange 51e as it is formed. Flange formation is stopped when the mandrel is contacted by one or more additional portions of the shell flange 51e being formed which are in opposition to each other or to the initially contacted portion of the flange whereby the mandrel is no longer free to move. As a result, as in the case of the apparatus 10, the force necessary to cause further movement of the shell axially into the stop ring is sharply increased so that such axial movement will cease. Moreover, since the flange 51e contacts the mandrel in several spaced places the pressure exerted axially of the shell is distributed over several circumferentially spaced segments with the result that the stress concentration is not sufficiently great as to cause buckling of the shell.

Although particular preferred embodiments of the invention have been disclosed hereinabove for purposes of illustration, it will be noted that variations or modifications thereof which lie within the scope of the appended claims are fully contemplated.

The embodiments of the invention in which an exclusive property or privilege is claimed are defined as follows:

1. A method for flanging the end of an annular shell comprising the steps:
 radially supporting the shell;
 deflecting at least one end of the shell substantially radially;
 preventing the edge of said deflected end from crossing a radially movable closed boundary of predetermined size and shape.

2. A method for flanging the end of an annular shell comprising the steps:
 internally supporting the shell in a radial direction;
 deflecting at least one end of the shell substantially radially outwardly;
 retaining the deflected end within a zone of fixed size and shape loosely surrounding and movable radially with respect to said shell.

3. A method for flanging the end of an annular shell comprising the steps:
 telescoping the shell snugly over a mandrel;
 pressing one end of the shell against a substantially radially extending surface fixed with respect to said mandrel and allowing said one end of said shell to flow outwardly in response to said pressure along said surface to form a shell flange;
 preventing further outward expansion of said shell flange when at least a pair of spaced portions on said flange contact an annular wall loosely surrounding and movable radially with respect to said mandrel.

4. Apparatus for forming a flange on an annular shell comprising in combination:
a base;
a mandrel for radially supporting said shell;
an annular member radially spaced from said mandrel;
an annular flange on one of said mandrel and member for supporting said shell;
one of said annular member and mandrel being fixed to said base and the other of said annular member and mandrel being radially slideably disposed thereupon;
means for urging said shell downwardly against said flange;
whereby a sufficient downward force will cause said lower end of said shell to flow radially along said flange until at least two points thereon contact one of said annular member and said mandrel.

5. Apparatus for forming a flange on an annular shell comprising:
a base;
a cylindrical mandrel fixed upon said base for telescopingly receiving said shell thereover and having a substantially radially extending flange adjacent the lower end thereof for abutting the lower end of said shell;
a stop ring slideably disposed on said base, spaced from and surrounding said flange and extending thereabove;
ram means for engaging said shell above said stop ring and for exerting a downward force thereon to drive same against said flange;
whereby a sufficient downward force will cause said lower end of said shell to flow outwardly along said flange until at least two points thereon contact said stop ring.

References Cited
UNITED STATES PATENTS

| | | | |
|---|---|---|---|
| 412,389 | 10/1889 | Isherwood | 72—370 |
| 1,407,076 | 2/1922 | Mills et al. | 113—120 |
| 1,933,480 | 10/1933 | Kronquest | 113—120 |
| 2,434,905 | 1/1948 | Burt et al. | 113—119 |

RICHARD J. HERBST, *Primary Examiner.*